United States Patent
Yoo et al.

(10) Patent No.: US 12,088,378 B2
(45) Date of Patent: Sep. 10, 2024

(54) LOW OVERHEAD AND HIGH ACCURACY CHANNEL STATE FEEDBACK USING NEURAL NETWORKS

(71) Applicant: QUALCOMM Incorporated, San Diego, CA (US)

(72) Inventors: Taesang Yoo, San Diego, CA (US); Pavan Kumar Vitthaladevuni, San Diego, CA (US); Naga Bhushan, San Diego, CA (US); Krishna Kiran Mukkavilli, San Diego, CA (US); Tingfang Ji, San Diego, CA (US); Hwan Joon Kwon, San Diego, CA (US); June Namgoong, San Diego, CA (US); Jay Kumar Sundararajan, San Diego, CA (US); Sooryanarayanan Gopalakrishnan, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 17/447,778

(22) Filed: Sep. 15, 2021

(65) Prior Publication Data

US 2022/0094411 A1 Mar. 24, 2022

Related U.S. Application Data

(60) Provisional application No. 63/080,109, filed on Sep. 18, 2020.

(51) Int. Cl.
*H04J 3/14* (2006.01)
*G06N 3/02* (2006.01)
(Continued)

(52) U.S. Cl.
CPC ............ *H04B 7/0626* (2013.01); *G06N 3/02* (2013.01); *H04B 7/0417* (2013.01); *H04L 5/0051* (2013.01)

(58) Field of Classification Search
CPC .. H04B 7/0626; H04B 7/0417; H04B 7/0695; H04B 7/0456; H04B 7/0658;
(Continued)

(56) References Cited

U.S. PATENT DOCUMENTS 9,294,172 B2 * 3/2016 Park ..................... H04B 7/0617
2011/0075752 A1 3/2011 Zheng et al.
(Continued)

OTHER PUBLICATIONS

International Search Report and Written Opinion—PCT/US2021/071484—ISA/EPO—dated Jan. 10, 2022.
(Continued)

*Primary Examiner* — Phuongchau Ba Nguyen
(74) *Attorney, Agent, or Firm* — Harrity & Harrity LLP/Qualcomm Incorporated

(57) ABSTRACT

A base station may precode a first reference signal using a first precoder (P1) and at least one second reference signal using at least one second precoder (P2). At least two UEs may measure the first reference signal and the at least one second reference signal, and transmit channel state feedback based on the measuring (m11 and m12 for a first UE, and m21 and m22 for a second UE). The channel state feedback may comprise channel state information compressed by at least one neural network. The base station may derive a higher-level precoder (W) for multiple-input multiple-output (MIMO) downlink transmission to the at least two UEs.

24 Claims, 10 Drawing Sheets

(51) Int. Cl.
*H04B 7/0417* (2017.01)
*H04B 7/06* (2006.01)
*H04L 5/00* (2006.01)

(58) Field of Classification Search
CPC ...... H04B 7/06952; G06N 3/02; G06N 3/045; G06N 3/044; G06N 3/08; H04L 5/0051; H04L 1/0029; H04L 25/0254; H04L 1/0026; H04L 5/0048; H04L 47/10; H04L 43/50; H04L 12/2697; H04L 43/0852; H04L 43/00
See application file for complete search history.

(56) References Cited

U.S. PATENT DOCUMENTS

| | | |
|---|---|---|
| 2011/0134859 A1 | 6/2011 | Li et al. |
| 2014/0204770 A1 | 7/2014 | Mondal et al. |
| 2014/0369291 A1* | 12/2014 | Zhang .................. H04B 7/024 370/329 |
| 2015/0030006 A1 | 1/2015 | Fujio et al. |
| 2016/0226647 A1* | 8/2016 | Wang .................. H04L 1/0026 |
| 2017/0047973 A1* | 2/2017 | Wu ..................... H04B 7/0478 |
| 2017/0324455 A1 | 11/2017 | Soriaga et al. |
| 2019/0036569 A1* | 1/2019 | Deng .................. H04B 7/0417 |
| 2020/0084787 A1 | 3/2020 | Hao et al. |
| 2020/0413488 A1* | 12/2020 | Han ..................... H04W 88/10 |
| 2021/0126682 A1* | 4/2021 | Hong .................. H04B 7/0626 |
| 2021/0143885 A1* | 5/2021 | Großmann ........... H04B 7/0626 |
| 2021/0336667 A1* | 10/2021 | Bengtsson ........... H04B 7/0469 |
| 2022/0224391 A1* | 7/2022 | Ramireddy .......... H04B 7/0478 |
| 2023/0246695 A1* | 8/2023 | Wang ..................... H04B 7/06 375/267 |
| 2023/0361842 A1* | 11/2023 | Hajri .................. H04B 7/0639 |

OTHER PUBLICATIONS

Lu C., et al., "MIMO Channel Information Feedback Using Deep Recurrent Network", IEEE Communications Letters, IEEE Service Center, Piscataway, NJ, US, vol. 23, No. 1, Jan. 1, 2019 (Jan. 1, 2019), XP011696277, pp. 188-191, ISSN: 1089-7798, DOI:10.1109/LCOMM.2018.2882829 [retrieved on Jan. 7, 2019] abstract, sections 2, 3, figures 1-3, the whole document.

* cited by examiner

LOW OVERHEAD AND HIGH ACCURACY CHANNEL STATE FEEDBACK USING NEURAL NETWORKS

CROSS-REFERENCE TO RELATED APPLICATION

This Patent Application claims priority to U.S. Provisional Patent Application No. 63/080,109, filed on Sep. 18, 2020, entitled "LOW OVERHEAD AND HIGH ACCURACY CHANNEL STATE FEEDBACK USING NEURAL NETWORKS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for low overhead and high accuracy channel state feedback using neural networks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, a first reference signal corresponding to a first precoded channel associated with a first precoder and at least one second reference signal corresponding to at least one second precoded channel associated with at least one second precoder. The method may further include measuring the first reference signal to obtain the first precoded channel. The method may include measuring the at least one second reference signal to obtain the at least one second precoded channel. The method may further include transmitting, to the base station, first channel state feedback based at least in part on the first precoded channel and second channel state feedback based at least in part on the at least one second precoded channel, wherein the first channel state feedback and the second channel state feedback are based at least in part on outputs of at least one neural network.

Some aspects described herein relate to a method of wireless communication performed by a base station. The method may include transmitting, to a first UE, a first reference signal using a first precoder and at least one second reference signal using at least one second precoder. The method may further include receiving, from the first UE, first channel state feedback based at least in part on measurements of the first reference signal and second channel state feedback based at least in part on measurements of the at least one second reference signal, wherein the first channel state feedback and the second channel state feedback are decompressed using at least one neural network.

Some aspects described herein relate to an apparatus for wireless communication at a UE. The apparatus may include a memory and one or more processors coupled to the memory. The one or more processors may be configured to receive, from a base station, a first reference signal corresponding to a first precoded channel associated with a first precoder and at least one second reference signal corresponding to at least one second precoded channel associated with at least one second precoder. The one or more processors may be further configured to measure the first reference signal to obtain the first precoded channel. The one or more processors may be configured to measure the at least one second reference signal to obtain the at least one second precoded channel. The one or more processors may be further configured to transmit, to the base station, first channel state feedback based at least in part on the first precoded channel and second channel state feedback based at least in part on the at least one second precoded channel, wherein the first channel state feedback and the second channel state feedback are based at least in part on outputs of at least one neural network.

Some aspects described herein relate to an apparatus for wireless communication at a base station. The apparatus may include a memory and one or more processors coupled to the memory. The one or more processors may be configured to transmit, to a first UE, a first reference signal using a first precoder and at least one second reference signal using at least one second precoder. The one or more processors may be further configured to receive, from the first UE, first channel state feedback based at least in part on measurements of the first reference signal and second channel state feedback based at least in part on measurements of the at least one second reference signal, wherein the first channel state feedback and the second channel state feedback are decompressed using at least one neural network.

Some aspects described herein relate to a non-transitory computer-readable medium that stores a set of instructions for wireless communication by a UE. The set of instructions, when executed by one or more processors of the UE, may cause the UE to receive, from a base station, a first reference signal corresponding to a first precoded channel associated with a first precoder and at least one second reference signal corresponding to at least one second precoded channel associated with at least one second precoder. The set of instructions, when executed by one or more processors of the UE, may further cause the UE to measure the first reference signal to obtain the first precoded channel. The set of instructions, when executed by one or more processors of the UE, may cause the UE to measure the at least one second reference signal to obtain the at least one second precoded channel. The set of instructions, when executed by one or more processors of the UE, may further cause the UE to transmit, to the base station, first channel state feedback based at least in part on the first precoded channel and second channel state feedback based at least in part on the at least one second precoded channel, wherein the first channel state feedback and the second channel state feedback are based at least in part on outputs of at least one neural network.

Some aspects described herein relate to a non-transitory computer-readable medium that stores a set of instructions for wireless communication by a base station. The set of instructions, when executed by one or more processors of the base station, may cause the base station to transmit, to a first UE, a first reference signal using a first precoder and at least one second reference signal using at least one second precoder. The set of instructions, when executed by one or more processors of the base station, may further cause the base station to receive, from the first UE, first channel state feedback based at least in part on measurements of the first reference signal and second channel state feedback based at least in part on measurements of the at least one second reference signal, wherein the first channel state feedback and the second channel state feedback are decompressed using at least one neural network.

Some aspects described herein relate to an apparatus for wireless communication. The apparatus may include means for receiving, from a base station, a first reference signal corresponding to a first precoded channel associated with a first precoder and at least one second reference signal corresponding to at least one second precoded channel associated with at least one second precoder. The apparatus may further include means for measuring the first reference signal to obtain the first precoded channel. The apparatus may include means for measuring the at least one second reference signal to obtain the at least one second precoded channel. The apparatus may further include means for transmitting, to the base station, first channel state feedback based at least in part on the first precoded channel and second channel state feedback based at least in part on the at least one second precoded channel, wherein the first channel state feedback and the second channel state feedback are based at least in part on outputs of at least one neural network.

Some aspects described herein relate to an apparatus for wireless communication. The apparatus may include means for transmitting, to a first UE, a first reference signal using a first precoder and at least one second reference signal using at least one second precoder. The apparatus may further include means for receiving, from the first UE, first channel state feedback based at least in part on measurements of the first reference signal and second channel state feedback based at least in part on measurements of the at least one second reference signal, wherein the first channel state feedback and the second channel state feedback are decompressed using at least one neural network.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
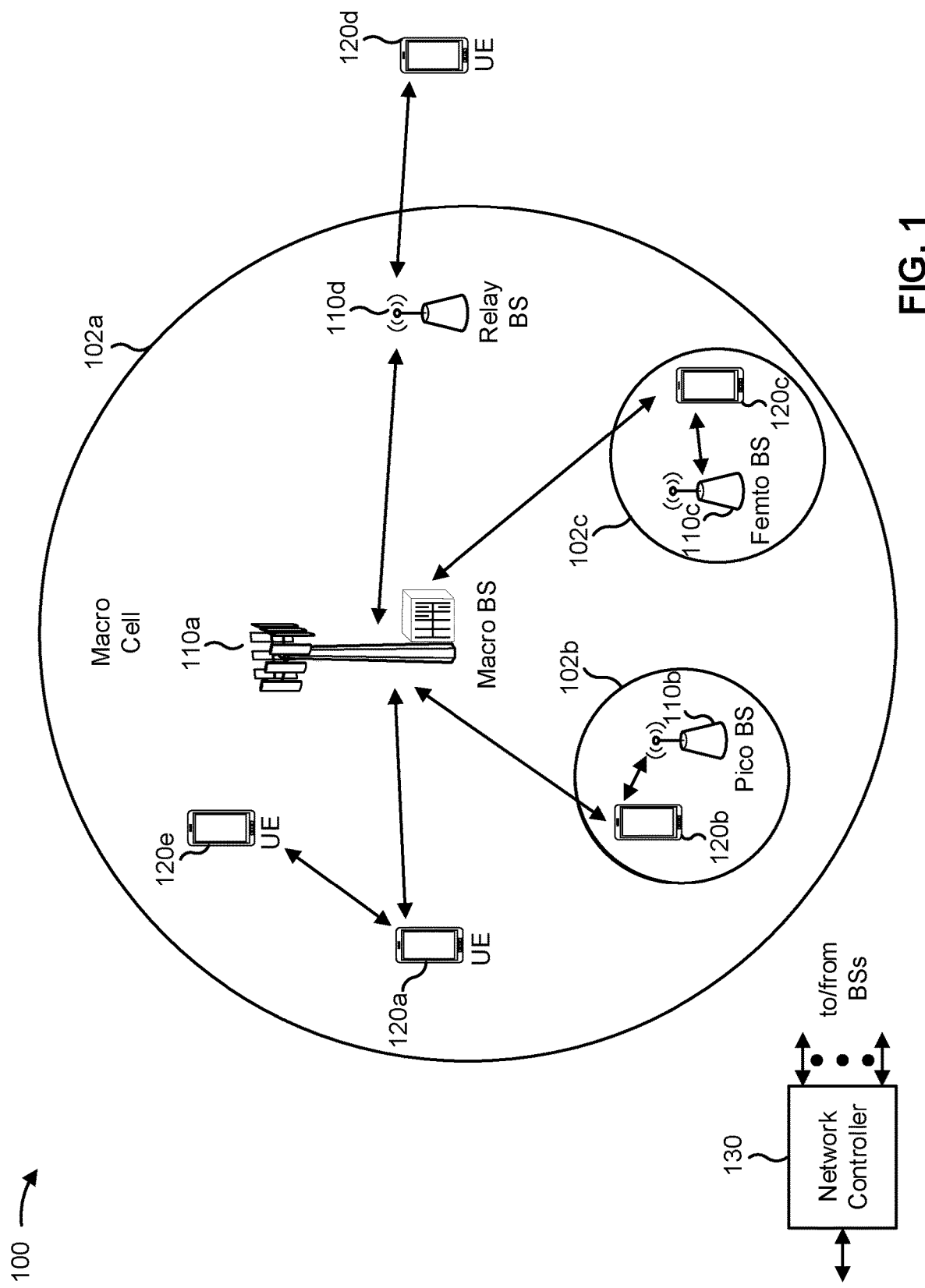
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" or "mmW" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
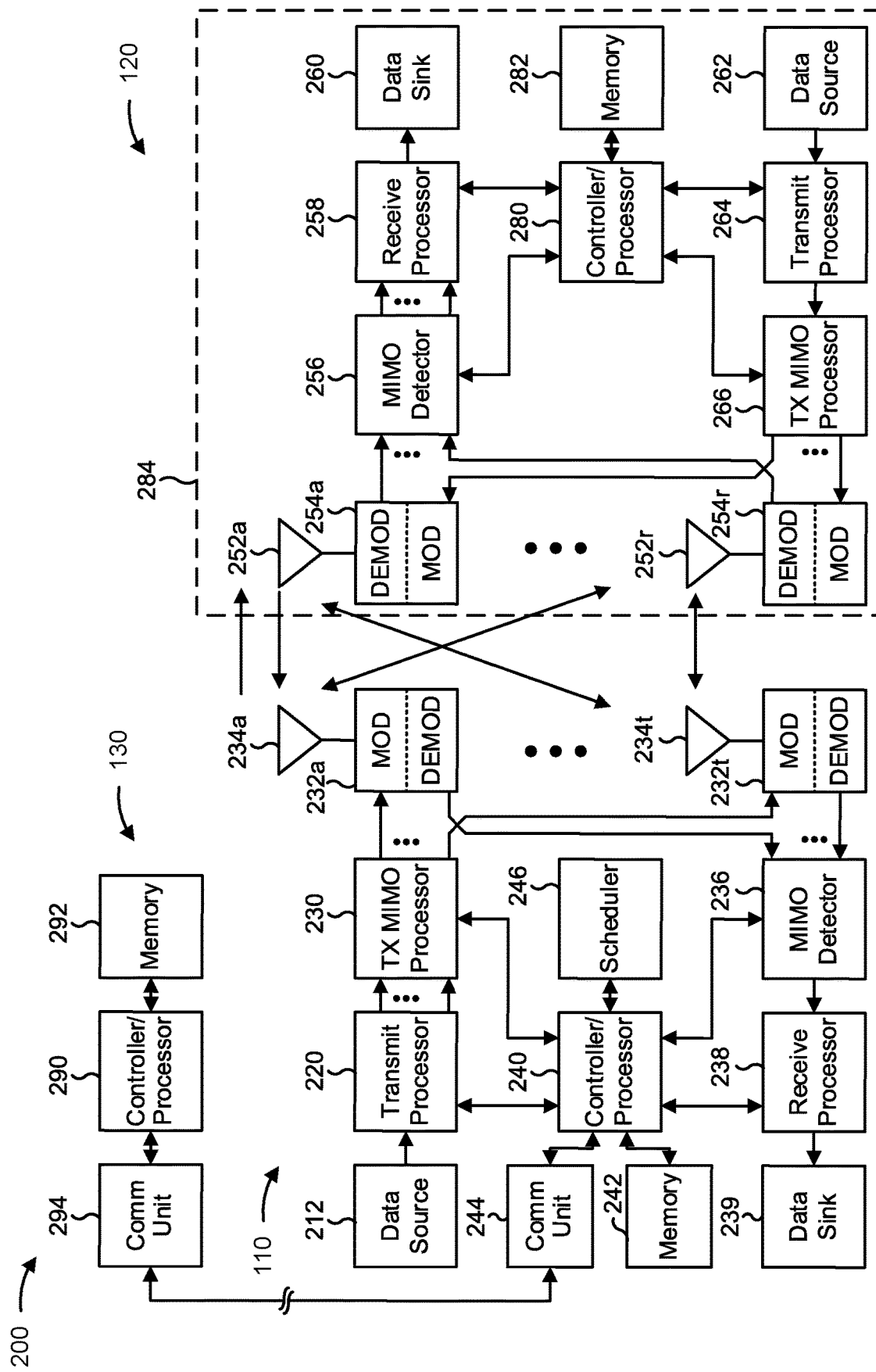
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with low overhead and high accuracy channel state feedback using neural networks, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 900 of FIG. 9) may include means for receiving, from a base station (e.g., the base station 110 and/or apparatus 1000 of FIG. 10) a first reference signal corresponding to a first precoded channel associated with a first precoder and at least one second reference signal corresponding to at least one second precoded channel associated with at least one second precoder; means for measuring the first reference signal to obtain the first precoded channel; means for measuring the at least one second reference signal to obtain the at least one second precoded channel; and/or means for transmitting, to the base station, first channel state feedback based at least in part on the first precoded channel and second channel state feedback based at least in part on the at least one second precoded channel, wherein the first channel state feedback and the second channel state feedback are based at least in part on outputs of at least one neural network. The means for the UE to perform operations described herein may include, for example, one or more of antenna 252, modem 254, MIMO detector 256, receive processor 258, transmit processor 264, TX MIMO processor 266, controller/processor 280, or memory 282.

In some aspects, a base station (e.g., base station 110, apparatus 1000 of FIG. 10, and/or the like) may include means for transmitting, to a UE (e.g., UE 120, apparatus 900 of FIG. 9, and/or the like), a first reference signal using a first precoder and at least one second reference signal using at least one second precoder; means for receiving, from the first UE, first channel state feedback based at least in part on measurements of the first reference signal and second channel state feedback based at least in part on measurements of the at least one second reference signal, wherein the first channel state feedback and the second channel state feedback are decompressed using at least one neural network. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
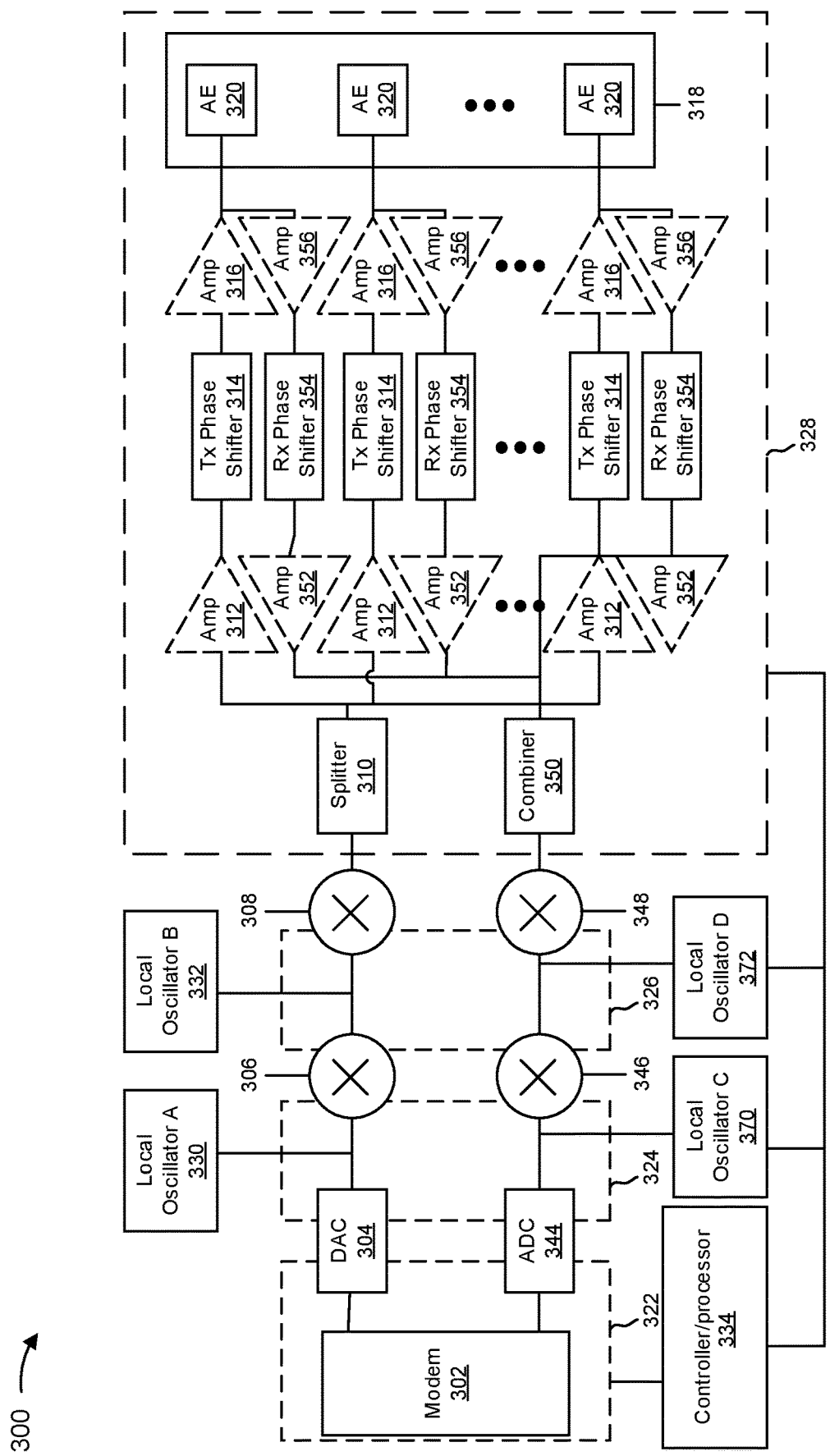
FIG. 3 is a diagram illustrating an example of beamforming architecture, in accordance with the present disclosure.

FIG. 3 is a diagram illustrating an example beamforming architecture 300 that supports beamforming for mmW communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320. In some examples, the modem 302 may be one or more of the modems 232 or modems 254 described in connection with FIG. 2.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306 and 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312 and 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312 and 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312 and 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312 and 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312 and 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352 and 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, and 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312 and 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312 and 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312 and 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
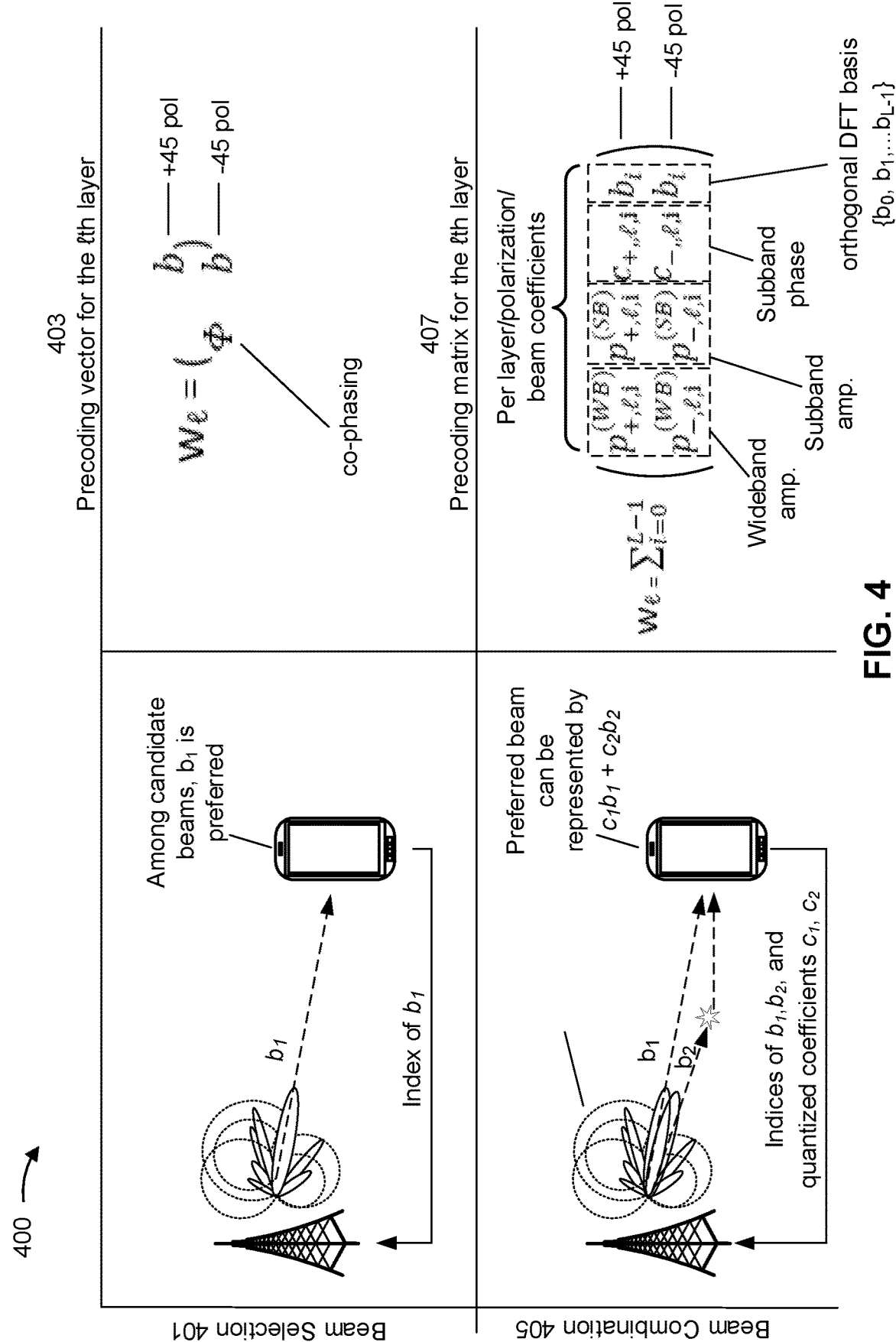
FIG. 4 is a diagram illustrating an example of precoding matrices, in accordance with the present disclosure.

FIG. 4 is a diagram illustrating an example 400 of precoding matrices, in accordance with the present disclosure. As shown by reference number 401, when a UE (e.g., UE 120) selects a beam (e.g., beam $b_1$ as shown in example 400) from a base station (e.g., base station 110), the UE 120 may transmit an indication of this selection to the base station 110. In some aspects, as further shown in FIG. 4, the indication may include an index of the beam $b_1$. Although the description herein focuses on the UE 120 selecting a beam (or combination of beams) from the base station 110, the description similarly applies to one UE selecting a beam (or combination of beams) from another UE (e.g., for use on a sidelink channel) and/or to one base station selecting a beam (or combination of beams) from another base station (e.g., for use on a wireless backhaul).

As shown by reference number 403, the base station 110 may select a precoding matrix $w_l$ based on the index of the beam $b_1$. The precoding matrix $w_l$ may include a vector b defining the beam $b_1$ for one or more polarizations. For example, the vector b defining the beam $b_1$ may be included for a +45 degree polarization and a −45 degree polarization, as shown in example 400. Accordingly, in some aspects, the one or more polarizations may be orthogonal, or at least quasi-orthogonal. As further shown in FIG. 4, one or more coefficients may be applied to the vector b for at least one polarization. For example, a co-phasing coefficient Φ may apply to the vector b for the −45 polarization. The base station 110 may use the precoding matrix $w_l$ to configure one or more antenna ports of the base station 110 to form the beam $b_1$ selected by the UE 120.

In some aspects, as shown by reference number 405, the UE 120 may select a combined beam. For example, the UE 120 may select a combination of beam $b_1$ and beam $b_2$. Although the description herein focuses on a combination of two beams, the description similarly applies to combinations of more than two beams (e.g., three beams, four beams, and so on).

As shown in FIG. 4, when the UE 120 selects a combination of beams (e.g., beam $b_1$ and beam $b_2$ as shown in example 400), the UE 120 may transmit an indication of this combination to the base station 110. In some aspects, as further shown in FIG. 4, the indication may include an index of the beam $b_1$, an index of the beam $b_2$, and quantized coefficients for a channel matrix H (e.g., quantized coefficients $c_1$ and $c_2$ as shown in example 400), where matrix H defines the channel formed by the combination of beam $b_1$ and beam $b_2$.

As shown by reference number 407, the base station 110 may determine a precoding matrix $w_l$ based on the indices and the quantized coefficients. The precoding matrix $w_l$ may include a vector $b_i$ defining beam i (from 0 until L−1 when the UE 120 selects a combination of L number of beams) for one or more polarizations. For example, the vector $b_i$ defining beam i may be included for a +45 degree polarization and a −45 degree polarization, as shown in example 400. Accordingly, in some aspects, the one or more polarizations may be orthogonal, or at least quasi-orthogonal.

As further shown in FIG. 4, one or more coefficients may be applied to the vector b for at least one polarization. For example, the quantized coefficients $c_{+,l,i}$ and $c_{-,l,i}$ may apply to the vector $b_i$ for the +45 degree polarization and the vector $b_i$ for the +45 degree polarization, respectively. In some aspects, the base station 110 may apply additional coefficients, such as wideband coefficients (e.g., coefficients $p_{-,l,i}^{(WB)}$ and $p_{-,l,i}^{(WB)}$ may apply to the vector $b_i$ for the +45 degree polarization and the vector $b_i$ for the +45 degree polarization, respectively), subband coefficients (coefficients $p_{-,l,i}^{(SB)}$ and $p_{-,l,i}^{(SB)}$ may apply to the vector $b_i$ for the +45 degree polarization and the vector $b_i$ for the +45 degree polarization, respectively), among other examples. The base station 110 may use the precoding matrix $w_l$ to configure one or more antenna ports of the base station 110 to form the combination of beams selected by the UE 120.

As indicated above, FIG. 4 is provided as an example. Other examples may differ from what is described with respect to FIG. 4.

Figure 5:
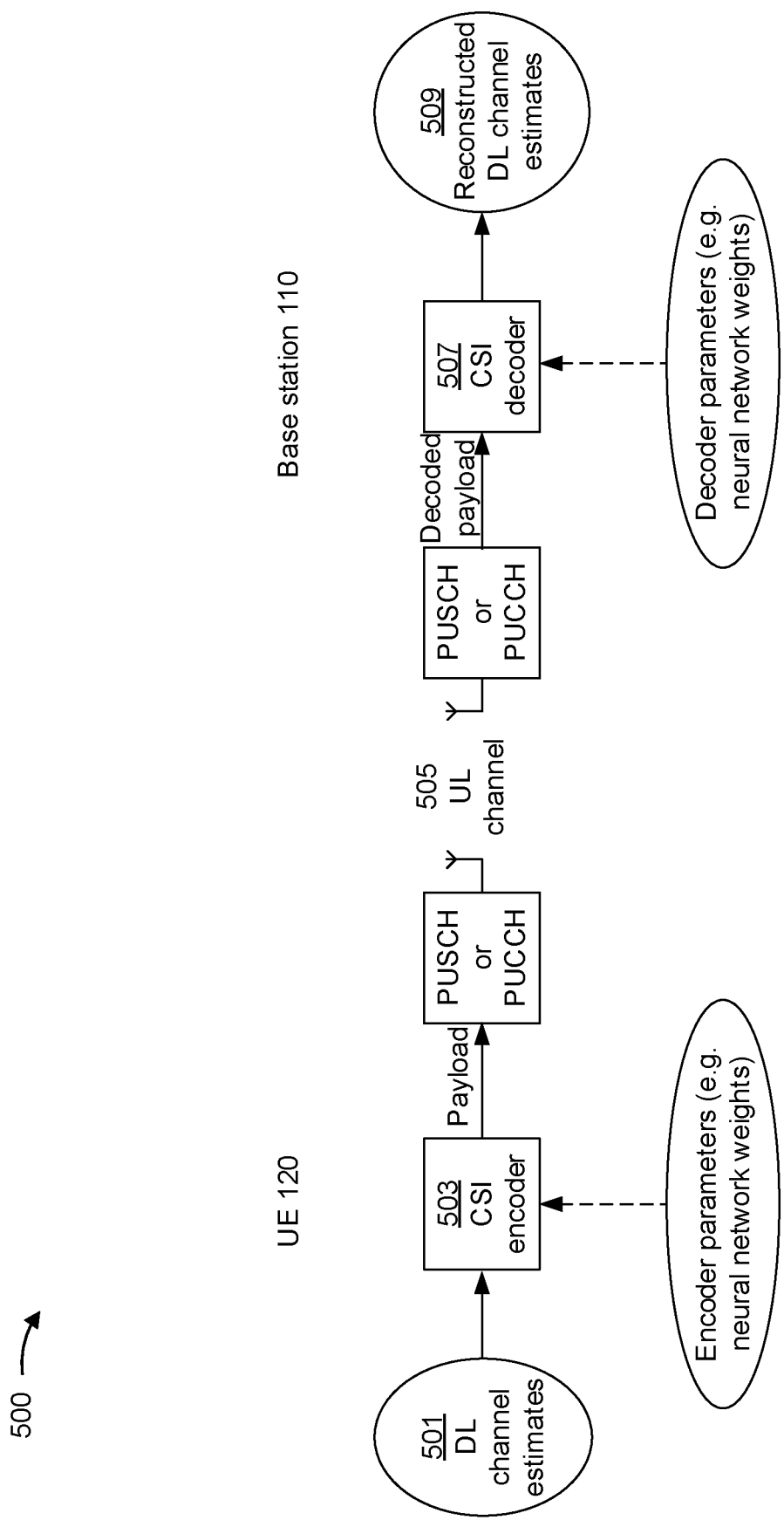
FIG. 5 is a diagram illustrating an example of encoding and decoding channel state feedback using neural networks, in accordance with the present disclosure.

FIG. 5 is a diagram illustrating an example 500 of encoding and decoding channel state feedback using neural networks, in accordance with the present disclosure. When a UE (e.g., UE 120) is selecting a beam or a combination of beams (e.g., as described in connection with FIG. 4), the UE 120 may provide channel state feedback to the base station 110. For example, as described in connection with FIG. 4, the channel state feedback may include quantized coefficients for a channel matrix H, where matrix H represents a channel formed by the combination of beams selected by the UE 120. Accordingly, as shown in FIG. 5, the channel state feedback may include a plurality of estimates 501, determined by the UE 120, on one or more downlink channels from the base station 110 to the UE 120.

In some aspects, instead of using pre-defined procedures (e.g., as described in connection with FIG. 4) for the UE 120 to obtain channel state feedback from H, the channel state feedback may be directly obtained by applying a neural network on a raw channel H. For example, a channel state information (CSI) encoder 503 may reduce channel matrix H to a matrix m of smaller dimension (and therefore smaller size) than matrix H. Although described herein as a matrix, m may additionally or alternatively be a vector, a sequence of bits, or an index. Accordingly, the UE 120 may transmit a reduced payload over an uplink channel 505 (e.g., a physical uplink control channel (PUCCH), a physical uplink shared channel (PUSCH), among other examples) to the base station 110.

In some aspects, as shown in FIG. 5, the CSI encoder 503 may be reversible such that the base station 110 may recover an estimated channel matrix $\hat{H}$ from a matrix m of smaller dimension using a corresponding CSI decoder 507. Accordingly, the base station 110 may recover the plurality of estimates 509, determined by the UE 120, on one or more downlink channels from the base station 110 to the UE 120. As described below, the CSI decoder 507 may be trained (e.g., by the base station 110 and/or the UE 120) such that estimated channel matrix $\hat{H}$ is within a threshold accuracy of channel matrix H.

In some aspects, and as shown in FIG. 5, the CSI encoder 503 and/or the CSI decoder 507 may each include a neural network configured by one or more weights. A neural network may include one or more nodes organized along one or more layers, where each node has at least one corresponding weight and corresponding activation function. Data provided to one or more of the nodes on an input layer will flow through the nodes (e.g., being acted upon by the corresponding activation functions and weights) according to connections between the nodes. In some aspects, the neural network may include additional layers (e.g., pooling layers).

In some aspects, the CSI encoder 503 and/or the CSI decoder 507 may further use previous outputs as partial inputs for each new encoding procedure. For example, the CSI encoder 503 and/or the CSI decoder 507 may each include a feedforward network or a long short-term memory network, among other examples. Although the description herein focuses on neural networks, the description similarly applies to other machine-learning-based models that reduce channel matrix H to a vector or a matrix m of smaller dimension (and therefore smaller size) than matrix H and that estimate channel matrix $\hat{H}$ within a threshold accuracy of the channel matrix H using the vector or the matrix m.

In some aspects, the base station 110 may train the encoder 503 (and corresponding decoder 507) and transmit one or more weights of the encoder to the UE 120 (e.g., via radio resource control (RRC) signaling). For example, the base station 110 may use sounding reference signal (SRS) measurements and/or other uplink channel estimates as data for training the encoder 503 (and corresponding decoder 507). As an alternative, the UE 120 may train the encoder 503 (and corresponding decoder 507) and transmit one or more weights of the decoder to the base station 110 (e.g., via RRC signaling). For example, the UE 120 may use CSI reference signal (CSI-RS) measurements and/or other downlink channel estimates as data for training the encoder 503 (and corresponding decoder 507). As an alternative, the UE 120 and/or the base station 110 may be programmed (and/or otherwise preconfigured) with the one or weights (e.g., according to 3GPP specifications and/or another standard). In some aspects, the base station 110 and/or the UE 120 may train the encoder 503 (and corresponding decoder 507) using one or more weights that are programmed and/or otherwise preconfigured (e.g., according to 3 GPP specifications and/or another standard). The UE 120 and/or the base station 110 may train the encoder 503/decoder 507 by applying data to the encoder 503/decoder 507 and adjusting one or more weights of the encoder 503/decoder 507 until one or more cost functions (e.g., a mean-square error function) associated with the encoder 503/decoder 507 are reduced, locally minimized, globally minimized, among other examples.

As indicated above, FIG. 5 is provided as an example. Other examples may differ from what is described with respect to FIG. 5.

In some aspects, channel state feedback may grow very large when a UE determines many quantized coefficients and/or estimates feedback for many downlink channels from a base station to the UE. Moreover, a neural network (or other encoder/decoder) can only reduce channel state feedback by a particular number of dimensions before degrading the accuracy of the encoder/decoder below an accuracy threshold. Accordingly, even when encoding and decoding channel state feedback, the UE and the base station may still experience network overhead.

Techniques and apparatuses described herein allow a UE (e.g., UE 120) to reduce a size of channel state feedback by applying coarse precoding in combination with a neural network (or other encoder/decoder). Accordingly, the UE 120 and the base station 110 reduce network overhead by reducing a size of a payload including the channel state feedback. Moreover, the UE 120 and the base station 110 experience increased reliability and/or quality due to the reduced size of the payload. In some aspects, the UE 120 preserves more accuracy than by using a neural network (or other encoder/decoder) alone to achieve a comparable level of compression.

Figure 6:
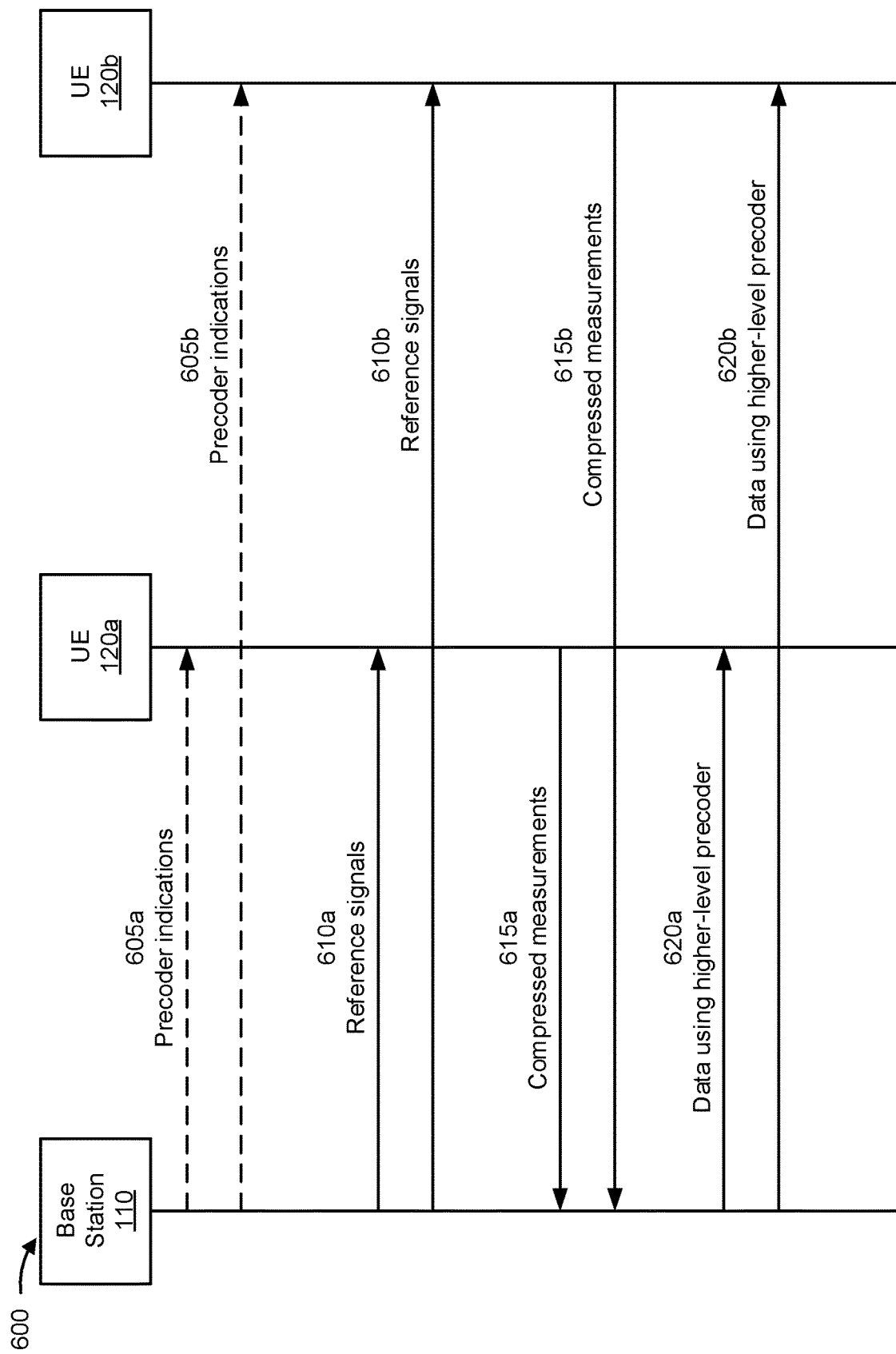
FIG. 6 is a diagram illustrating an example associated with low overhead and high accuracy channel state feedback using neural networks, in accordance with the present disclosure.

FIG. 6 is a diagram illustrating an example 600 associated with low overhead and high accuracy channel state feedback using neural networks, in accordance with the present disclosure. As shown in FIG. 6, example 600 includes communication between a base station 110, a UE 120*a*, and a UE 120*b*. In some aspects, the base station 110, the UE 120*a*, and the UE 120*b* may be included in a wireless network, such as wireless network 100. The base station 110, the UE 120*a*, and the UE 120*b* may communicate on a wireless access link, which may include an uplink and a downlink. Although the description herein focuses on two UEs, the description similarly applies to other quantities of UE (e.g., one UE, three UEs, four UEs, and so on).

As shown in connection with reference numbers 605*a* and 605*b*, the base station 110 may further transmit, and the UE 120*a* and the UE 120*b* may further receive, indications of a first precoder (e.g., represented by P1) and at least one second precoder (e.g., represented by P2). For example, the base station 110 may transmit, and the UE 120*a* and the UE 120*b* may receive, downlink control information including one or more fields (e.g., a precoding matrix indicator field) that indicate the first precoder P1 and the at least one second precoder P2. In some aspects, the base station 110 may use RRC signaling to transmit the indications to the UE 120*a* and the UE 120*b*. As an alternative, the base station 110 may apply the first precoder to a first reference signal and apply the at least one second precoder to at least one second reference signal. Accordingly, the UE 120*a* and the UE 120*b* may determine channel state feedback by measuring the first reference signal and the at least one second reference signal (e.g., as described in connection with reference numbers 610*a* and 610*b*) and without explicit indication of the first precoder P1 and the at least one second precoder P2, respectively.

As shown in connection with reference numbers 610*a* and 610*b*, the base station 110 may transmit, and the UE 120*a* and the UE 120*b* may receive the first reference signal (e.g., a CSI-RS) corresponding to a first channel (e.g., represented by H1) associated with the first precoder P1 and the at least one second reference signal (e.g., a CSI-RS) corresponding to at least one second channel (e.g., represented by H2) associated with the at least one second precoder P2. In some aspects, the first channel and the at least one second channel are MIMO channels.

In some aspects, the UE 120*a* may transmit, and the base station 110 may measure, at least one SRS or other reference signal. Accordingly, the base station 110 may determine the first precoder based at least in part on the at least one SRS or other reference signal from the UE 120*a* (e.g., as described in connection with FIG. 4 for beam selection).

Additionally, in some aspects, the UE 120*b* may transmit, and the base station 110 may measure, at least one SRS or other reference signal. Accordingly, the base station 110 may determine the at least one second precoder based at least in part on the at least one SRS or other reference signal from the UE 120*b* (e.g., as described in connection with FIG. 4 for beam selection).

In some aspects, the base station 110 may transmit to additional UEs. Accordingly, the base station 110 may include additional indications of precoders and reference signals corresponding to channels with those additional UEs. For example, the base station 110 may transmit, to the UE 120*a*, the UE 120*b*, and a third UE, a third reference signal (e.g., a CSI-RS) corresponding to a third channel (e.g., represented by H3) associated with a third precoder (e.g., represented by P3). In this example, the base station 110 may additionally transmit, and the third UE may receive, the first reference signal corresponding to the first channel H1 associated with the first precoder P1 and the at least one second reference signal corresponding to the at least one second channel H2 associated with the at least one second precoder P3.

As further shown in connection with reference number 610*a*, the base station 110 may transmit the first reference signal using the first precoder (P1). The transmitted first reference signal propagates through the first channel (H1) and arrives at the UE 120*a*. Accordingly, the UE 120*a* measures the first precoded channel H11 (which is equivalent to H1*P1). Additionally, the base station 110 may transmit the at least one second reference signal using the at least one second precoder (P2). The at least one second reference signal propagates through the first channel (H1) and arrives at the UE 120*a*. Accordingly, the UE 120*a* measures the at least one second precoded channel H12 (which is equivalent to H1*P2). Accordingly, the UE 120*a* may generate channel state feedback for the first precoded channel (e.g., represented by H11) and the at least one second precoded channel (e.g., represented by H12) (e.g., quantized coefficients as described in connection with FIG. 5). Because the precoded channels (H11 and H12) have smaller MIMO dimensions than the raw channel (H1), the resulting channel state feedback derived from the precoded channels may have smaller payload sizes than that derived from the raw channels.

Similarly, as further shown in connection with reference number 610*b*, the transmitted first reference signal propagates through the at least one second channel (H2) and arrives at the UE 120*b*. Accordingly, the UE 120*b* measures the precoded channel H21 (which is equivalent to H2*P1). Additionally, the at least one second reference signal propagates through the at least one second channel (H2) and arrives at the UE 120*b*. Accordingly, the UE 120*b* measures the precoded channel H22 (which is equivalent to H2*P2). Accordingly, the UE 120*b* may generate channel state feedback for the first precoded channel (e.g., represented by H21) and the at least one second precoded channel (e.g., represented by H22) (e.g., quantized coefficients as described in connection with FIG. 5). Because the precoded channels (H21 and H22) have smaller MIMO dimensions than the raw channel (H2), the resulting channel state feedback derived from the precoded channels may have smaller payload sizes than that derived from the raw channels.

As shown in connection with reference number 615*a*, the UE 120*a* may transmit, and the base station 110 may receive, first channel state feedback (e.g., represented by m11) based at least in part on measuring the first reference signal and second channel state feedback (e.g., represented by m12) based at least in part on measuring the at least one second reference signal. In some aspects, the first precoded channel H11 and the second precoded channel H12 are compressed using at least one neural network (e.g., as described in connection with FIG. 5). The neural network may consist of a CSI encoder run at the UE 120a and a CSI decoder run at the base station 110. In some aspects, the UE 120a trained the at least one neural network (consisting of CSI encoder/decoder) and transmitted, and the base station 110 received, one or more weights for the at least one neural network (CSI decoder). As an alternative, the base station 110 trained the at least one neural network (CSI encoder/decoder) and transmitted, and the UE 120a received, one or more weights for the at least one neural network (CSI encoder). Additionally, or alternatively, the neural network was trained elsewhere and loaded onto UE 120a and the base station 110. In any of the aspects described above, the UE 120a may apply the at least one neural network (CSI encoder), with the one or more weights, to compress the first precoded channel H11 to generate the first channel state information m11 (e.g., encoding H11 as m11) and the second precoded channel H12 to generate the second channel state information m12 (e.g., encoding H12 as m12).

In some aspects, the at least one neural network includes a feedforward network and a recurrent neural network (RNN) such as a long short-term memory (LSTM) network. Accordingly, the UE 120a may use encodings of previous channel state feedbacks to further compress the first channel to generate the first channel state information m11 and the second channel to generate the second channel state information m12.

As shown in connection with reference number 615b, the UE 120b may transmit, and the base station 110 may receive, third channel state feedback (e.g., represented by m21) based at least in part on measuring the first reference signal, and fourth channel state feedback (e.g., represented by m22) based at least in part on measuring the at least one second reference signal. In some aspects, the third precoded channel H21 and the fourth precoded channel H22 are compressed using at least one neural network (e.g., as described in connection with FIG. 5). The neural network may consist of a CSI encoder run at the UE 120b and a CSI decoder run at the base station 110. In some aspects, UE 120b trained the at least one neural network (consisting of CSI encoder/decoder) and transmitted, and the base station 110 received, one or more weights for the at least one neural network (CSI decoder). As an alternative, the base station 110 trained the at least one neural network (CSI encoder/decoder) and transmitted, and the UE 120b received, one or more weights for the at least one neural network (CSI encoder). Additionally, or alternatively, the neural network was trained elsewhere and loaded onto UE 120b and the base station 110. In any of the aspects described above, the UE 120b may apply the at least one neural network (CSI encoder), with the one or more weights, to compress the third precoded channel H21 to generate the third channel state information m21 (e.g., encoding H21 as m21) and the fourth precoded channel H22 to generate the fourth channel state information m22 (e.g., encoding H22 as m22).

In some aspects, the at least one neural network includes a feedforward network and an RNN such as an LSTM network. Accordingly, the UE 120b may use encodings of previous channel state feedbacks to further compress the first channel to generate the third channel state information m21 and the second channel to generate the fourth channel state information m22.

In some aspects, the UE 120a and the UE 120b may use at least one same neural network (e.g., a same structure with same weight(s) from the base station 110 and/or same weight(s) stored on the UE 120a and the UE 120b). Additionally, or alternatively, the UE 120a and the UE 120b may use at least one different neural network (e.g., with a same structure but different weight(s) from separate trainings on the UE 120a and the UE 120b and/or on the base station 110, with a same structure but different weight(s) stored on the UE 120a and the UE 120b, and/or with different structures).

As shown in connection with reference numbers 620a and 620b, the base station 110 may transmit, and the UE 120a and the UE 120b may receive, data using a higher-level precoder (e.g., represented by W). The data may be transmitted simultaneously to both UEs using the higher-level precoder in multi-user-MIMO (MU-MIMO) fashion. The higher-level precoder may be based at least in part on the first channel state feedback m11, the second channel state feedback m12, the third channel state feedback m21, and the fourth channel state feedback m22. For example, the base station may reconstruct the precoded channel H11 by feeding m11 through the CSI decoder. Similarly, the base station may reconstruct H12, H21, and H22. The base station may then derive the higher-level precoder W based on H11, H12, H21, H22. In some aspects, the base station 110 may derive W by applying the signal-to-leakage-ratio minimization principle on the composite precoded channel matrix [H11 H12; H21 H22] such that the leakage (e.g., interference caused to one or more unintended UEs) is minimized. The base station may use one or more other algorithms to derive W.

In some aspects, the first channel state feedback m11, the second channel state feedback m12, the third channel state feedback m21, and the fourth channel state feedback m22 are decompressed using at least one neural network (e.g., as described in connection with FIG. 5). The neural network may consist of a CSI encoder run at a UE and a CSI decoder run at the base station 110. In some aspects, the UE 120a and/or the UE 120b trained the at least one neural network (consisting of CSI encoder/decoder) and transmitted, and the base station 110 received, one or more weights for the at least one neural network (CSI decoder). As an alternative, the base station 110 trained the at least one neural network (CSI encoder/decoder). Additionally, or alternatively, the neural network was trained elsewhere and loaded onto the base station 110. In any of the aspects described above, the base station 110 may apply the at least one neural network (CSI decoder), with the one or more weights, to recover the first precoded channel H11 from the first channel state information m11, the second precoded channel H12 from the second channel state information m12, the third precoded channel H21 from the third channel state information m21, and the fourth precoded channel H22 from the fourth channel state information m22.

In some aspects, the base station 110 may use at least one same neural network for the first and second channel state feedback as for the third and fourth channel state feedback (e.g., a same structure with same weight(s) determined by the base station 110 and/or same weight(s) stored on the base station). Additionally, or alternatively, the base station 110 may use at least one different neural network for the first and second channel state feedback as compared with the third and fourth channel state feedback (e.g., with a same structure but different weight(s) from separate trainings on the UE 120a and the UE 120b and/or on the base station 110, with a same structure but different weight(s) stored on the base station 110, and/or with different structures).

In some aspects, the base station 110 may use a combination of techniques described above to obtain channel state information from UEs, for example, by requesting/applying the technique described in FIG. 6 to only some of the UEs, while requesting/applying other procedures/techniques on other UEs. For example, the base station 110 may request channel state feedback (e.g., as described above) from the UE 120a and the UE 120b and may request a different kind of CSI feedback (e.g., Type-II feedback specified in 3GPP specifications and/or another standard) from at least one additional UE. The base station 110 may determine the higher-level precoder W based on channel state feedbacks from the UE 120a, the UE 120b, and the at least one additional UE. Additionally, or alternatively, the base station 110 may use a combination of techniques as described in connection with FIG. 6 with no channel state feedback from other UEs. For example, the base station 110 may request channel state feedback (e.g., as described above) from the UE 120a and the UE 120b while not requesting any feedback from at least one additional UE. The base station 110 may derive a higher-level precoder W based on the channel state feedbacks from the UE 120a and the UE 120b. One reason for the base station 110 not requesting feedback from the at least one additional UE would be to save overhead. In some other cases, the base station 110 may request different types of feedback within a same UE (e.g., requesting channel state feedback, as described above on one channel (e.g., H11) from the UE 120a and Type-II feedback on another channel (e.g., H12) from the UE 120a).

By using techniques as described in connection with FIG. 6, the UE 120a and the UE 120b reduce a size of channel state feedback by applying coarse precoding in combination with the neural network and/or other encoder/decoder. Accordingly, the UE 120a, the UE 120b, and the base station 110 reduce communication overhead by reducing a size of a payload including the channel state feedback. Moreover, the UE 120a, the UE 120b, and the base station 110 experience increased link quality due to the higher accuracy of the channel state information.

As indicated above, FIG. 6 is provided as an example. Other examples may differ from what is described with respect to FIG. 6.

Figure 7:
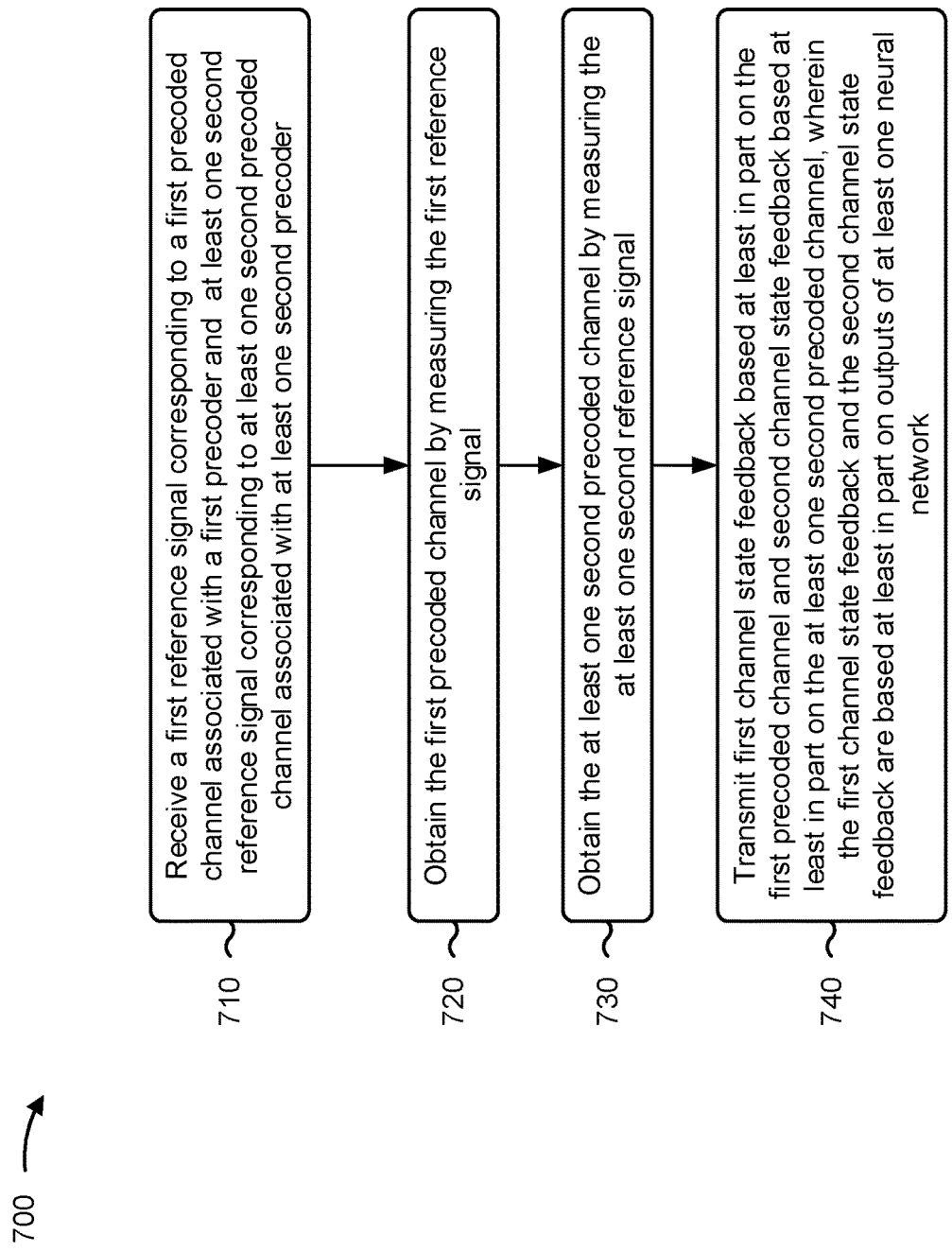
FIGS. 7 and 8 are diagrams illustrating example processes associated with low overhead and high accuracy channel state feedback using neural networks, in accordance with the present disclosure.

FIG. 7 is a diagram illustrating an example process 700 performed, for example, by a UE, in accordance with the present disclosure. Example process 700 is an example where the UE (e.g., UE 120 and/or apparatus 900 of FIG. 9) performs operations associated with low overhead and high accuracy channel state feedback using neural networks.

As shown in FIG. 7, in some aspects, process 700 may include receiving, from a base station (e.g., base station 110 and/or apparatus 1000 of FIG. 10), a first reference signal corresponding to a first precoded channel associated with a first precoder and at least one second reference signal corresponding to at least one second precoded channel associated with at least one second precoder (block 710). For example, the UE (e.g., using reception component 902, depicted in FIG. 9) may receive, from a base station, a first reference signal corresponding to a first precoded channel associated with a first precoder and the at least one second reference signal corresponding to at least one second precoded channel associated with at least one second precoder, as described herein.

As further shown in FIG. 7, in some aspects, process 700 may include obtaining the first precoded channel by measuring the first reference signal (block 720). For example, the UE (e.g., using measurement component 908, depicted in FIG. 9) may obtain the first precoded channel by measuring the first reference signal, as described herein.

As further shown in FIG. 7, in some aspects, process 700 may include obtaining the at least one second precoded channel by measuring the at least one second reference signal (block 730). For example, the UE (e.g., using measurement component 908) may obtain the at least one second precoded channel by measuring the at least one second reference signal, as described herein.

As further shown in FIG. 7, in some aspects, process 700 may include transmitting, to the base station, first channel state feedback based at least in part on the first precoded channel and second channel state feedback based at least in part on the at least one second precoded channel (block 740). For example, the UE (e.g., using transmission component 904, depicted in FIG. 9) may transmit, to the base station, first channel state feedback based at least in part on the first precoded channel and second channel state feedback based at least in part on the at least one second precoded channel, as described herein. In some aspects, the first channel state feedback and the second channel state feedback are based at least in part on outputs of at least one neural network.

Process 700 may include additional aspects, such as any single aspect or any combination of aspects described below and/or in connection with one or more other processes described elsewhere herein.

In a first aspect, process 700 further includes receiving (e.g., using reception component 902), from the base station, data using a higher-level precoder that is based at least in part on the first channel state feedback and the second channel state feedback.

In a second aspect, alone or in combination with the first aspect, process 700 further includes receiving (e.g., using reception component 902), from the base station, data using a higher-level precoder that is based at least in part on the first channel state feedback, the second channel state feedback, third channel state feedback based at least in part on measurements of the first reference signal corresponding to a third precoded channel associated with the first precoder from at least one additional UE, and fourth channel state feedback based at least in part on measurements of the at least one second reference signal corresponding to a fourth precoded channel associated with the second precoder from the at least one additional UE.

In a third aspect, alone or in combination with one or more of the first and second aspects, process 700 further includes transmitting (e.g., using transmission component 904), to the base station, at least one SRS or other reference signal, the first reference signal being received based at least in part on the at least one SRS or other reference signal.

In a fourth aspect, alone or in combination with one or more of the first through third aspects, the first channel and at least one the second channel are MIMO channels.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
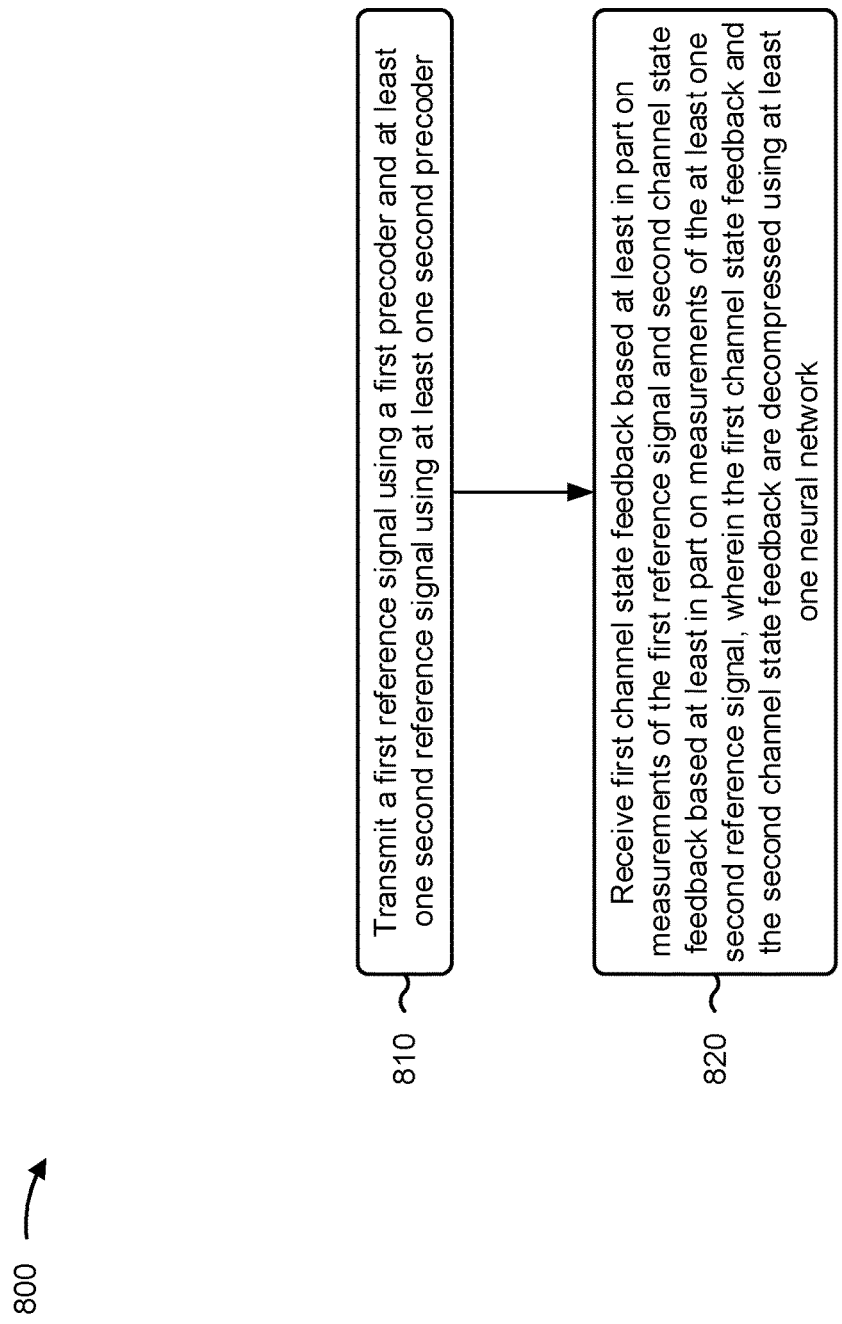

FIG. 8 is a diagram illustrating an example process 800 performed, for example, by a base station, in accordance with the present disclosure. Example process 800 is an example where the base station (e.g., base station 110 and/or apparatus 1000 of FIG. 10) performs operations associated with low overhead and high accuracy channel state feedback using neural networks.

As shown in FIG. 8, in some aspects, process 800 may include transmitting, to a first UE (e.g., UE 120 and/or apparatus 900 of FIG. 9), a first reference signal using a first precoder and at least one second reference signal using at least one second precoder (block 810). For example, the base station (e.g., using transmission component 1004, depicted in FIG. 10) may transmit, to a first UE, a first reference signal using a first precoder and at least one second reference signal using at least one second precoder, as described herein.

As further shown in FIG. 8, in some aspects, process 800 may include receiving, from the first UE, first channel state feedback based at least in part on measurements of the first reference signal and second channel state feedback based at least in part on measurements of the at least one second reference signal (block 820). For example, the base station (e.g., using reception component 1002, depicted in FIG. 10) may receive, from the first UE, first channel state feedback based at least in part on measurements of the first reference signal and second channel state feedback based at least in part on measurements of the at least one second reference signal, as described herein. In some aspects, the first channel state feedback and the second channel state feedback are decompressed using at least one neural network.

Process 800 may include additional aspects, such as any single aspect or any combination of aspects described below and/or in connection with one or more other processes described elsewhere herein.

In a first aspects, process 800 further includes transmitting (e.g., using transmission component 1004), to the first UE, data using a higher-level precoder that is based at least in part on the first channel state feedback and the second channel state feedback.

In a second aspect, alone or in combination with the first aspect, process 800 further includes transmitting (e.g., using transmission component 1004), to a second UE, the first reference signal using the first precoder and the at least one second reference signal using the at least one second precoder, and receiving (e.g., using reception component 1002), from the second UE, third channel state feedback based at least in part on measurements of the first reference signal and fourth channel state feedback based at least in part on measurements of the at least one second reference signal, where the third channel state feedback and the fourth channel state feedback are decompressed using the at least one neural network.

In a third aspect, alone or in combination with one or more of the first and second aspects, process 800 further includes transmitting (e.g., using transmission component 1004), to the first UE and the second UE, data using a higher-level precoder that is based at least in part on the first channel state feedback, the second channel state feedback, the third channel state feedback, and the fourth channel state feedback.

In a fourth aspect, alone or in combination with one or more of the first through third aspects, process 800 further includes measuring (e.g., using reception component 1002), from the second UE, at least one SRS or other reference signal, the second precoder being determined based at least in part on measuring the at least one SRS or other reference signal.

In a fifth aspect, alone or in combination with one or more of the first through fourth aspects, process 800 further includes measuring (e.g., using reception component 1002), from the first UE, at least one SRS or other reference signal, the first precoder being determined based at least in part on measuring the at least one SRS or other reference signal.

In a sixth aspect, alone or in combination with one or more of the first through fifth aspects, the first channel and at least one the second channel are MIMO channels.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
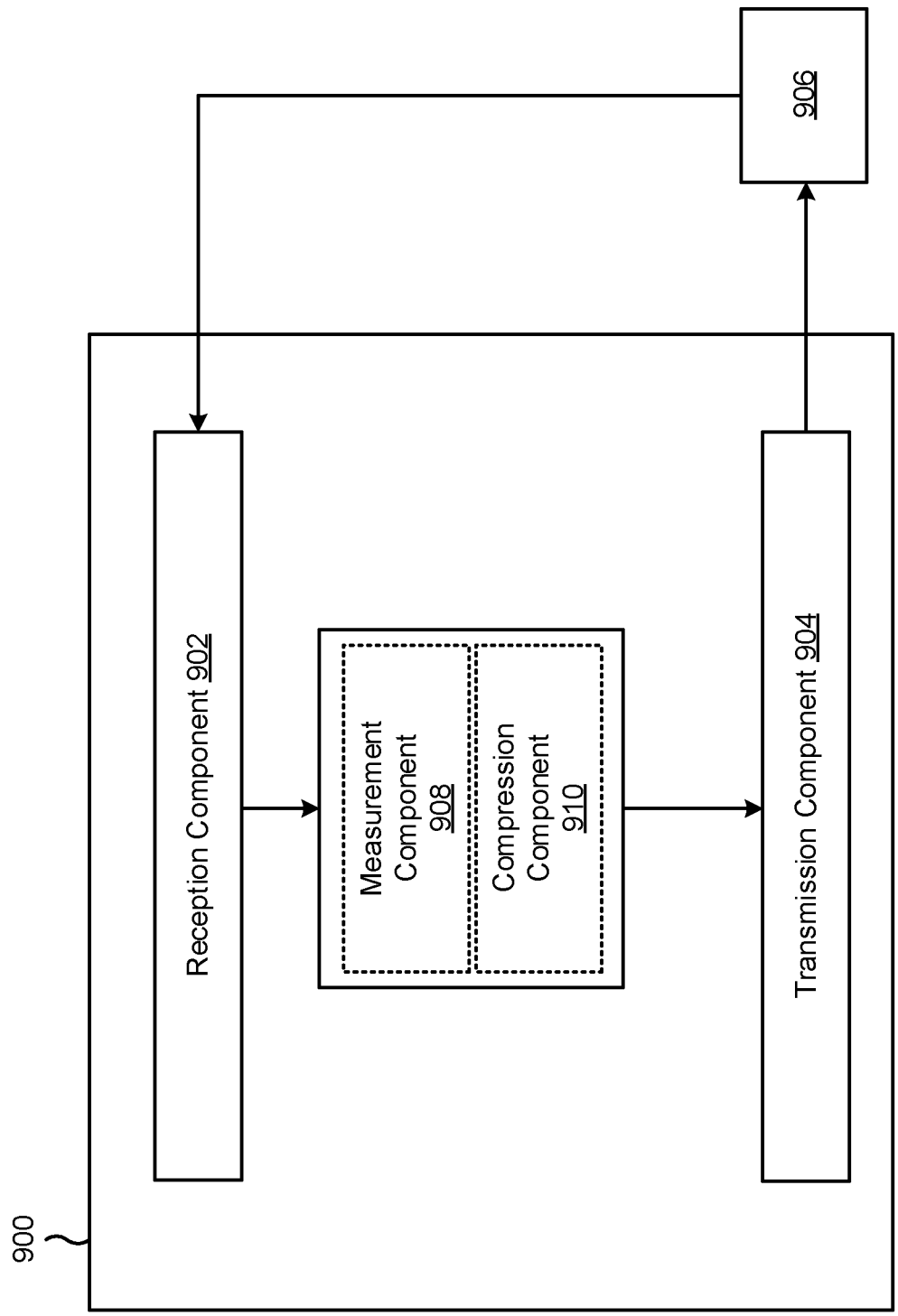
FIGS. 9 and 10 are diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a measurement component 908 or a compression component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

In some aspects, the reception component 902 may receive (e.g., from the apparatus 906) a first reference signal corresponding to a first precoded channel associated with a first precoder and at least one second reference signal corresponding to at least one second precoded channel associated with at least one second precoder. Accordingly, the measurement component 908 may measure the first reference signal to obtain the first precoded channel, and may measure the at least one second reference signal to obtain the at least one second precoded channel. In some aspects, the measurement component 908 may include one or more antennas, a demodulator, a MIMO detector, a receive processor, a controller/processor, a memory, or a combination thereof, of the UE described above in connection with FIG. 2. Moreover, the transmission component 904 may transmit (e.g., to the apparatus 906) first channel state feedback based at least in part on the measurement component 908 obtaining the first precoded channel and second channel state feedback based at least in part on the measurement component 908 obtaining the at least one second precoded channel. In some aspects, the compression component 910 may compress the first channel and the second channel using at least one neural network before the transmission component 904 transmits the compressed first channel state feedback and second channel state feedback. In some aspects, the compression component 910 may include a modulator, a transmit MIMO processor, a transmit processor, a controller/processor, a memory, or a combination thereof, of the UE described above in connection with FIG. 2.

In some aspects, the reception component 902 may receive (e.g., from the apparatus 906) data using a higher-level precoder that is based at least in part on the first channel state feedback and the second channel state feedback. In some aspects, the reception component 902 may receive (e.g., from the apparatus 906) data using a higher-level precoder that is based at least in part on the first channel state feedback, the second channel state feedback, third channel state feedback based at least in part on measurements of the first reference signal corresponding to a third precoded channel associated with the first precoder from at least one additional apparatus (e.g., an additional UE), and fourth channel state feedback based at least in part on measurements of the at least one second reference signal corresponding to a fourth precoded channel associated with the second precoder from the at least one additional apparatus.

In some aspects, the transmission component 904 may transmit, to the apparatus 906, at least one SRS or other reference signal. Accordingly, the reception component 902 may receive the first reference signal based at least in part on the transmission component 904 transmitting the at least one SRS or other reference signal.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
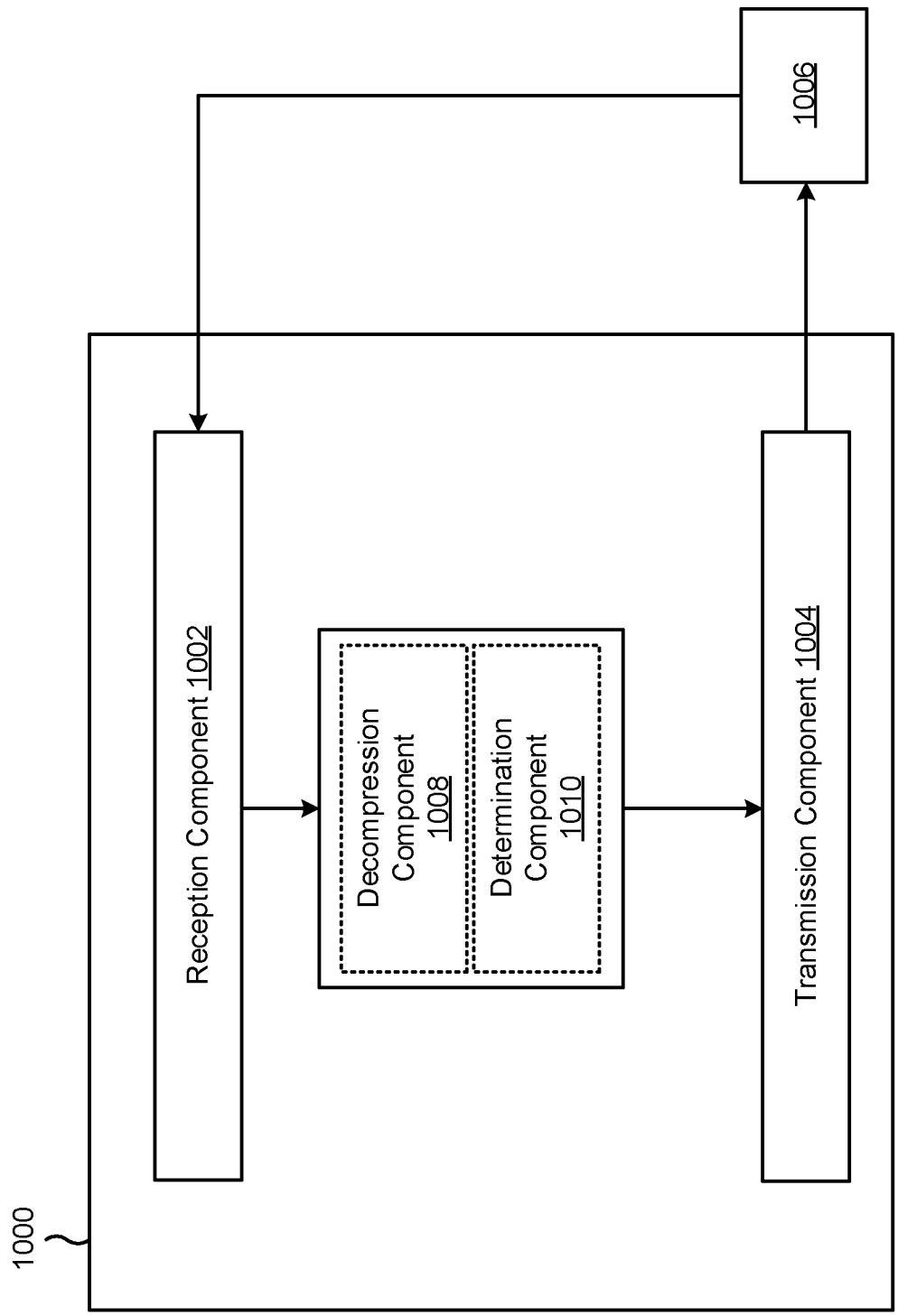

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a decompression component 1008 or a determination component 1010, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

In some aspects, the transmission component 1004 may transmit (e.g., to the apparatus 1006) a first reference signal using a first precoder and at least one second reference signal using at least one second precoder. Moreover, the reception component 1002 may receive, from the apparatus 1006, first channel state feedback based at least in part on measurements of the first reference signal and second channel state feedback based at least in part on measurements of the at least one second reference signal. In some aspects, the decompression component 1008 may decompress the first channel state feedback and the second channel state feedback using at least one neural network after the reception component 1002 receives the first channel state feedback and the second channel state feedback. In some aspects, the decompression component 1008 may include a demodulator, a MIMO detector, a receive processor, a controller/processor, a memory, or a combination thereof, of the base station described above in connection with FIG. 2.

In some aspects, the transmission component 1004 may transmit (e.g., to the apparatus 1006) data using a higher-level precoder that is based at least in part on the first channel state feedback and the second channel state feedback. In some aspects, the determination component 1010 may determine the higher-level precoder based at least in part on the first channel state feedback and the second channel state feedback. In some aspects, the determination component 1010 may include one or more antennas, a demodulator, a MIMO detector, a receive processor, a controller/processor, a memory, or a combination thereof, of the base station described above in connection with FIG. 2.

In some aspects, the transmission component 1004 may transmit, to an additional apparatus (e.g., an additional UE), the first reference signal using the first precoder and the at least one second reference signal using the at least one second precoder. Moreover, the reception component 1002 may receive (e.g., from the additional apparatus) third channel state feedback based at least in part on measuring the first reference signal and fourth channel state feedback based at least in part on measuring the at least one second reference signal. In some aspects, the decompression component 1008 may decompress the third channel state feedback and the fourth channel state feedback using the at least one neural network.

In some aspects, the transmission component 1004 may transmit (e.g., to the apparatus 1006 and the additional apparatus) data using a higher-level precoder that is based at least in part on the first channel state feedback, the second channel state feedback, the third channel state feedback, and the fourth channel state feedback. In some aspects, the determination component 1010 may determine the higher-level precoder based at least in part on the first channel state feedback, the second channel state feedback, the third channel state feedback, and the fourth channel state feedback.

In some aspects, the reception component 1002 may measure (e.g., from the apparatus 1006) at least one SRS another reference signal. Accordingly, the determination component 1010 may determine the first precoder based at least in part on these measurements from the reception component 1002.

Additionally, or alternatively, the reception component 1002 may measure (e.g., from the additional apparatus) at least one SRS another reference signal. The determination component 1010 may determine the at least one second precoder based at least in part on these measurements from the reception component 1002.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a base station, a first reference signal corresponding to a first precoded channel associated with a first precoder and at least one second reference signal corresponding to at least one second precoded channel associated with at least one second precoder; measuring the first reference signal to obtain the first precoded channel; measuring the at least one second reference signal to obtain the at least one second precoded channel; and transmitting, to the base station, first channel state feedback based at least in part on the first precoded channel and second channel state feedback based at least in part on the at least one second precoded channel, wherein the first channel state feedback and the second channel state feedback are based at least in part on outputs of at least one neural network.

Aspect 2: The method of Aspect 1, further comprising: receiving, from the base station, data using a higher-level precoder that is based at least in part on the first channel state feedback and the second channel state feedback.

Aspect 3: The method of Aspect 1, further comprising: receiving, from the base station, data using a higher-level precoder that is based at least in part on the first channel state feedback, the second channel state feedback, third channel state feedback based at least in part on measurements of the first reference signal corresponding to a third precoded channel associated with the first precoder from at least one additional UE, and fourth channel state feedback based at least in part on measurements of the at least one second reference signal corresponding to a fourth precoded channel associated with the second precoder from the at least one additional UE.

Aspect 4: The method of any of Aspects 1 through 3, further comprising: transmitting, to the base station, at least one sounding reference signal (SRS) or other reference signal, wherein the first reference signal is received based at least in part on the at least one SRS or other reference signal.

Aspect 5: The method any of Aspects 1 through 4, wherein the first channel and at least one the second channel are multiple-input multiple-output (MIMO) channels.

Aspect 6: A method of wireless communication performed by a base station, comprising: transmitting, to a first user equipment (UE), a first reference signal using a first precoder and at least one second reference signal using at least one second precoder; and receiving, from the first UE, first channel state feedback based at least in part on measurements of the first reference signal and second channel state feedback based at least in part on measurements of the at least one second reference signal, wherein the first channel state feedback and the second channel state feedback are decompressed using at least one neural network.

Aspect 7: The method of Aspect 6, further comprising: transmitting, to the first UE, data using a higher-level precoder that is based at least in part on the first channel state feedback and the second channel state feedback.

Aspect 8: The method of Aspect 6, further comprising: transmitting, to a second UE, the first reference signal using the first precoder and the at least one second reference signal using the at least one second precoder; and receiving, from the second UE, third channel state feedback based at least in part on measurements of the first reference signal and fourth channel state feedback based at least in part on measurements of the at least one second reference signal, wherein the third channel state feedback and the fourth channel state feedback are decompressed using the at least one neural network.

Aspect 9: The method of Aspect 8, further comprising: transmitting, to the first UE and the second UE, data using a higher-level precoder that is based at least in part on the first channel state feedback, the second channel state feedback, the third channel state feedback, and the fourth channel state feedback.

Aspect 10: The method of any of Aspects 8 through 9, further comprising: measuring, from the second UE, at least one sounding reference signal (SRS) or other reference signal, wherein the second precoder is determined based at least in part on measuring the at least one SRS or other reference signal.

Aspect 11: The method of any of Aspects 6 through 10, further comprising: measuring, from the first UE, at least one sounding reference signal (SRS) or other reference signal, wherein the first precoder is determined based at least in part on measuring the at least one SRS or other reference signal.

Aspect 12: The method of any of Aspects 6 through 11, wherein the first channel and the at least one second channel are multiple-input multiple-output (MIMO) channels.

Aspect 13: An apparatus for wireless communication at a device, comprising a processor; memory coupled with the processor; and instructions stored in the memory and executable by the processor to cause the apparatus to perform the method of one or more of Aspects 1-5.

Aspect 14: A device for wireless communication, comprising a memory and one or more processors coupled to the memory, the one or more processors configured to perform the method of one or more of Aspects 1-5.

Aspect 15: An apparatus for wireless communication, comprising at least one means for performing the method of one or more of Aspects 1-5.

Aspect 16: A non-transitory computer-readable medium storing code for wireless communication, the code comprising instructions executable by a processor to perform the method of one or more of Aspects 1-5.

Aspect 17: A non-transitory computer-readable medium storing a set of instructions for wireless communication, the set of instructions comprising one or more instructions that, when executed by one or more processors of a device, cause the device to perform the method of one or more of Aspects 1-5.

Aspect 18: An apparatus for wireless communication at a device, comprising a processor; memory coupled with the processor; and instructions stored in the memory and executable by the processor to cause the apparatus to perform the method of one or more of Aspects 6-12.

Aspect 19: A device for wireless communication, comprising a memory and one or more processors coupled to the memory, the one or more processors configured to perform the method of one or more of Aspects 6-12.

Aspect 20: An apparatus for wireless communication, comprising at least one means for performing the method of one or more of Aspects 6-12.

Aspect 21: A non-transitory computer-readable medium storing code for wireless communication, the code comprising instructions executable by a processor to perform the method of one or more of Aspects 6-12.

Aspect 22: A non-transitory computer-readable medium storing a set of instructions for wireless communication, the set of instructions comprising one or more instructions that, when executed by one or more processors of a device, cause the device to perform the method of one or more of Aspects 6-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      receive, from a network entity, one or more indications of a first precoder or at least one second precoder;
      receive, from the network entity, a first reference signal corresponding to a first precoded channel associated with the first precoder and at least one second reference signal corresponding to at least one second precoded channel associated with the at least one second precoder;
      measure the first reference signal to obtain the first precoded channel;
      measure the at least one second reference signal to obtain the at least one second precoded channel; and
      transmit, to the network entity, first channel state feedback based at least in part on the first precoded channel and second channel state feedback based at least in part on the at least one second precoded channel, wherein the first channel state feedback and the second channel state feedback are based at least in part on outputs of at least one neural network.

2. The apparatus of claim 1, wherein the one or more processors are further configured to:
   receive, from the network entity, data using a higher-level precoder that is based at least in part on the first channel state feedback and the second channel state feedback.

3. The apparatus of claim 1, wherein the one or more processors are further configured to:
   receive, from the network entity, data using a higher-level precoder that is based at least in part on the first channel state feedback, the second channel state feedback, third channel state feedback based at least in part on measurements of the first reference signal corresponding to a third precoded channel associated with the first precoder from at least one additional UE, and fourth channel state feedback based at least in part on measurements of the at least one second reference signal corresponding to a fourth precoded channel associated with the at least one second precoder from the at least one additional UE.

4. The apparatus of claim 1, wherein the one or more processors are further configured to:
   transmit, to the network entity, at least one sounding reference signal (SRS) or other reference signal,
   wherein the first reference signal is received based at least in part on the at least one SRS or other reference signal.

5. The apparatus of claim 1, wherein the first precoded channel and the at least one second precoded channel are multiple-input multiple-output (MIMO) channels.

6. An apparatus for wireless communication at a network entity, comprising:
   a memory; and
   one or more processors, coupled to the memory, configured to:
      transmit, to a first user equipment (UE), one or more indications of a first precoder or at least one second precoder;
      transmit, to the first UE, a first reference signal using the first precoder and at least one second reference signal using the at least one second precoder; and
      receive, from the first UE, first channel state feedback based at least in part on measurements of the first reference signal and second channel state feedback based at least in part on measurements of the at least one second reference signal, wherein the first channel state feedback and the second channel state feedback are decompressed using at least one neural network.

7. The apparatus of claim 6, wherein the one or more processors are further configured to:
   transmit, to the first UE, data using a higher-level precoder that is based at least in part on the first channel state feedback and the second channel state feedback.

8. The apparatus of claim 6, wherein the one or more processors are further configured to:
   transmit, to a second UE, the first reference signal using the first precoder and the at least one second reference signal using the at least one second precoder; and
   receive, from the second UE, third channel state feedback based at least in part on measurements of the first reference signal and fourth channel state feedback based at least in part on measurements of the at least one second reference signal, wherein the third channel state feedback and the fourth channel state feedback are decompressed using the at least one neural network.

9. The apparatus of claim 8, wherein the one or more processors are further configured to:
   transmit, to the first UE and the second UE, data using a higher-level precoder that is based at least in part on the first channel state feedback, the second channel state feedback, the third channel state feedback, and the fourth channel state feedback.

10. The apparatus of claim 8, wherein the one or more processors are further configured to:
   measure, from the second UE, at least one sounding reference signal (SRS) or other reference signal,
   wherein the at least one second precoder is determined based at least in part on measuring the at least one SRS or other reference signal.

11. The apparatus of claim 6, wherein the one or more processors are further configured to:
  measure, from the first UE, at least one sounding reference signal (SRS) or other reference signal,
  wherein the first precoder is determined based at least in part on measuring the at least one SRS or other reference signal.

12. The apparatus of claim 6, wherein the first reference signal corresponds to a first precoded channel, and wherein the at least one second reference signal corresponds to at least one second precoded channel, and wherein the first precoded channel and the at least one second precoded channel are multiple-input multiple-output (MIMO) channels.

13. A method of wireless communication performed by a user equipment (UE), comprising:
  receiving, from a network entity, one or more indications of a first precoder or at least one second precoder;
  receiving, from the network entity, a first reference signal corresponding to a first precoded channel associated with the first precoder and at least one second reference signal corresponding to at least one second precoded channel associated with the at least one second precoder;
  measuring the first reference signal to obtain the first precoded channel;
  measuring the at least one second reference signal to obtain the at least one second precoded channel; and
  transmitting, to the network entity, first channel state feedback based at least in part on the first precoded channel and second channel state feedback based at least in part on the at least one second precoded channel, wherein the first channel state feedback and the second channel state feedback are based at least in part on outputs of at least one neural network.

14. The method of claim 13, further comprising:
  receiving, from the network entity, data using a higher-level precoder that is based at least in part on the first channel state feedback and the second channel state feedback.

15. The method of claim 13, further comprising:
  receiving, from the network entity, data using a higher-level precoder that is based at least in part on the first channel state feedback, the second channel state feedback, third channel state feedback based at least in part on measurements of the first reference signal corresponding to a third precoded channel associated with the first precoder from at least one additional UE, and fourth channel state feedback based at least in part on measurements of the at least one second reference signal corresponding to a fourth precoded channel associated with the at least one second precoder from the at least one additional UE.

16. The method of claim 13, further comprising:
  transmitting, to the network entity, at least one sounding reference signal (SRS) or other reference signal,
  wherein the first reference signal is received based at least in part on the at least one SRS or other reference signal.

17. The method of claim 13, wherein the first precoded channel and the at least one second precoded channel are multiple-input multiple-output (MIMO) channels.

18. A method of wireless communication performed by a network entity, comprising:
  transmitting, to a first user equipment (UE), one or more indications of a first precoder or at least one second precoder;
  transmitting, to the first UE, a first reference signal using the first precoder and at least one second reference signal using the at least one second precoder; and
  receiving, from the first UE, first channel state feedback based at least in part on measurements of the first reference signal and second channel state feedback based at least in part on measurements of the at least one second reference signal, wherein the first channel state feedback and the second channel state feedback are decompressed using at least one neural network.

19. The method of claim 18, further comprising:
  transmitting, to the first UE, data using a higher-level precoder that is based at least in part on the first channel state feedback and the second channel state feedback.

20. The method of claim 18, further comprising:
  transmitting, to a second UE, the first reference signal using the first precoder and the at least one second reference signal using the at least one second precoder; and
  receiving, from the second UE, third channel state feedback based at least in part on measurements of the first reference signal and fourth channel state feedback based at least in part on measurements of the at least one second reference signal, wherein the third channel state feedback and the fourth channel state feedback are decompressed using the at least one neural network.

21. The method of claim 20, further comprising:
  transmitting, to the first UE and the second UE, data using a higher-level precoder that is based at least in part on the first channel state feedback, the second channel state feedback, the third channel state feedback, and the fourth channel state feedback.

22. The method of claim 20, further comprising:
  measuring, from the second UE, at least one sounding reference signal (SRS) or other reference signal,
  wherein the at least one second precoder is determined based at least in part on measuring the at least one SRS or other reference signal.

23. The method of claim 18, further comprising:
  measuring, from the first UE, at least one sounding reference signal (SRS) or other reference signal,
  wherein the first precoder is determined based at least in part on measuring the at least one SRS or other reference signal.

24. The method of claim 18, wherein the first reference signal corresponds to a first precoded channel, and wherein the at least one second reference signal corresponds to at least one second precoded channel, and wherein the first precoded channel and the at least one second precoded channel are multiple-input multiple-output (MIMO) channels.

* * * * *